(12) United States Patent
Lantigua

(10) Patent No.: US 6,847,352 B2
(45) Date of Patent: Jan. 25, 2005

(54) STRESS RELIEVING MOUSE

(76) Inventor: Juan J Lantigua, 1677 N. Gardiner Dr., Bay Shore, NY (US) 11706

( * ) Notice: Subject to any disclaimer, the term of this patent is extended or adjusted under 35 U.S.C. 154(b) by 82 days.

(21) Appl. No.: 09/948,022

(22) Filed: Sep. 6, 2001

(65) Prior Publication Data

US 2003/0043117 A1 Mar. 6, 2003

(51) Int. Cl.$^7$ ................................................. G09G 5/08
(52) U.S. Cl. ...................... 345/163; 345/156; 345/157; 345/158; 345/161; 345/167; 248/118.1; 248/118.3; 273/148 B; 340/825.19; 341/20; 463/37
(58) Field of Search ................................ 345/163, 156, 345/155, 157, 161, 168, 167, 158; 248/118.1, 118.3; 273/148 B; 463/37; 340/825.19; 341/20

(56) References Cited

U.S. PATENT DOCUMENTS

| | | | |
|---|---|---|---|
| 5,340,067 A | * | 8/1994 | Martin et al. ............. 248/118.5 |
| 5,894,302 A | * | 4/1999 | Scenna et al. ............... 345/163 |
| 5,894,303 A | | 4/1999 | Barr ........................... 345/163 |
| 5,966,118 A | | 10/1999 | Miyakawa ................... 345/163 |
| 5,990,870 A | | 11/1999 | Chen et al. .................. 345/163 |
| 6,005,553 A | | 12/1999 | Goldstein et al. ........... 345/163 |
| 6,011,543 A | | 1/2000 | Tian ............................ 345/163 |
| 6,016,138 A | | 1/2000 | Harskamp et al. .......... 345/163 |
| 6,031,522 A | | 2/2000 | Strand ......................... 345/163 |
| 6,031,523 A | | 2/2000 | Bunke et al. ................ 345/163 |
| 6,072,471 A | | 6/2000 | Lo ............................... 345/163 |
| 6,304,249 B1 | * | 10/2001 | Derocher et al. ........... 345/163 |
| 6,369,799 B1 | * | 4/2002 | Miceli et al. ................ 345/167 |
| 6,396,479 B2 | * | 5/2002 | Gordon ....................... 345/163 |
| 6,424,335 B1 | * | 7/2002 | Kim et al. ................... 345/158 |
| 6,441,805 B1 | * | 8/2002 | Reid et al. ................... 345/163 |
| 6,509,891 B1 | * | 1/2003 | Sheehan et al. ............. 345/167 |

* cited by examiner

Primary Examiner—Xiao Wu
Assistant Examiner—Abbas Abdulselam
(74) Attorney, Agent, or Firm—Michael I. Kroll

(57) ABSTRACT

The present invention 10 discloses a computer mouse having a body with an ovate palm support area 38 and a planar peripherally receding support 42 for the hypothenar mass and left 40 and right anterior buttons 44 eccentrically positioned askew the apex of the ovate form with one button located on a platform 46 and elevated and angularly positioned relative to the other button 40 that is substantially planar. The button platform 46 could also be selectively movable along a limited distance of the anterior periphery of the body to allow a user 12 to adjust the present invention 10 to conform to different sized hands and fingers of varying lengths. The present invention 10 is designated to elevate the wrist 20 by supporting the palm so the hand 24 is comfortably bent slightly downward and not in the unnatural upward angle with the writs 20 resting on the surface area thereby applying pressure thereto and affecting the related nerves and arteries passing through the underside of the wrist 20 that is common in the prior art.

5 Claims, 14 Drawing Sheets

STRESS RELIEVING MOUSE

BACKGROUND OF THE INVENTION

1. Field of the Invention

The present invention relates generally to computer mouse devices, and more specifically, to a computer mouse having a body with an ovoid palm support area and a planar peripherally receding support for the hypothenar mass and left and right anterior buttons eccentrically positioned askew the apex of the ovate form with one button located on a platform and elevated and angularly positioned relative to the other button that is substantially planar. The button platform could also be selectively movable along a limited distance of the anterior periphery of the body to allow a user to adjust the present invention to conform to different sized hands and fingers of varying lengths. The present invention is designed to elevate the wrist by supporting the palm so the hand is comfortably bent slightly downward and not in the unnatural upward angle with the wrist resting on the surface area thereby applying pressure thereto and affecting the related nerves and arteries passing through the underside of the wrist that is common in the prior art. The unnatural wrist flexion and pressure applied thereto combine with repeated activity of the flexor tendons and often result in repetitive stress disorders.

2. Description of the Prior Art

There are other ergonomic computer mice. Typical of these is U.S. Pat. No. 5,894,302 issued to Leslie Scenna et al. on Apr. 13, 1999.

Another patent was issued to Ann E. Barr on Apr. 13, 1999 as U.S. Pat. No. 5,894,303. Yet another U.S. Pat. No. 5,990,870 was issued to Mei-Yun Chen on Nov. 23, 1999 and still yet another was issued to Masae Miyakawa on Oct. 12, 1999 as U.S. Pat. No. 5,966,118.

Another patent was issued to Mark Goldstein et al. on Dec. 21, 1999 as U.S. Pat. No. 6,005,553. Yet another patent was issued as U.S. Pat. No. 6,011,543 to Tom Tian on Jan. 4, 2000. Another patent was issued to Lisa Harshkamp on Jan. 18, 2000 as U.S. Pat. No. 6,016,138 and still yet another was issued on Feb. 29, 2000 to Todd Strand as U.S. Pat. No. 6,031,522. A patent was issued on Feb. 29, 2000 to Jay B. Bunke et al. as U.S. Pat. No. 6,031,523 and on Jun. 6, 2000 U.S. Pat. No. 6,072,471 was issued to Jack Lo.

An ergonomic housing for a computer mouse helpful in minimizing the occurrence and alleviating the symptoms of repetitive strain injuries is disclosed. The mouse housing includes a palm support area having a hump which is an asymmetrically skewed bulge about with a user's hand may pivot. The palm support area also includes a tapered tail for supporting the hand and wrist off the surface. The housing includes at least one button which is elevated and angled to minimize flexion of and accompanying stress on the tendons of the finger. A thumb support is also provided to allow the thumb to rest off the surface and to aid in lifting the mouse.

A hand holdable computer mouse has a base, a top and a body. The base rests on a work surface and the body is vertically disposed above the base. The body has an external contour which substantially conforms to the mean of the contour of the palm side of the hand when the hand is in a relaxed, neutral condition, with the palm surface of the hand vertically oriented. The mouse is operated with the hand in a cupped, vertically oriented condition, with the wrist in a neutral condition with respect to radial and ulnar deviation, and with the forearm in a neutral condition.

A finger rest structure of computer mouse, including a housing having a profile substantially suitable for manual operation of a user and a finger rest unit including at least one rest plate transversely projecting from a lateral side of the housing for a finger to rest thereon. Two rest plates are respectively disposed on left and right sides of the housing near front and rear ends. Alternatively, the rest plate is integrally connected along the rear side and a part of lateral side of the housing. Alternatively, the rest plates are pivotally and foldably connected with the housing or disposed at two ends of a rotary plate which is rotatably disposed under the housing, whereby the rest plate can be selectively extended or retracted. The rest plate serves to bear most of the weight of the hand and reduce the frictional force of the hand against the table face. Also, the rest plate enlarges the bottom area of the mouse, whereby the mouse can more closely attach to the table face during moving and the control of the mouse is facilitated.

A computer mouse capable of stimulating therapeutic points of the human body to reduce user fatigue. Projection bodies for stimulating the therapeutic points are provided on the main body and click buttons of the computer mouse.

An improved ergonomic computer mouse is provided. The ergonomic mouse allows for the operator's hand to remain in a relaxed position in as near a state of repose as possible while operating the mouse. The shape of the mouse reduces several of the known high-risk postures during mouse use.

A multi-dimensional computer mouse includes a casing in which a circuit board is mounted. Left and right buttons are provided on a top of the casing for functioning as regular mouse push buttons. A third push button is arranged between the left and right buttons. A post extends from the third button to the circuit board. A spherical expansion is formed on a lower end of the post and rotatably received in a socket fixed on the circuit board for forming a joint allowing the post to be rotated from a neutral position to front and rear actuation positions wherein a collar of the post contacts and triggers a front contact switch and a rear contact switch. The post is floatingly supported by a spring arranged between the socket and the collar thereby allowing the post to be depressed against the spring for having the lower end of the post contact and trigger a bottom contact switch. Thus, a user is allowed to selectively trigger either one of the three contact switches for controlling a monitor cursor of a computer to which the mouse is coupled.

A mouse for use in association with a computer is disclosed. The mouse comprises a housing having a lower surface and an upper surface with side walls therebetween to define a lower chamber therewithin. The housing includes a peripheral extension wall extending upwardly from the periphery of the housing as an extension of the side walls to define an upper recessed cavity. A membrane having a periphery secured to the upper regions of the extension wall forms the top surface of a primary chamber. The membrane is fabricated of a deformable resilient elastomeric material. A quantity of gel-like fluid within the primary chamber is adapted to change shape of the housing membrane from an initial shape to a custom fit shape conforming substantially with the anatomical contours of a user's hand for enhanced comfort and reduced fatigue during use of the computer mouse, the gel-like fluid retaining the custom fit shape for a substantial period of time following release of the use of the computer mouse and thereafter returning substantially to the initial shape.

A hand-held mouse has a base pointing unit with a movement sensor and a plurality of switches for selecting a visual object indicated by a location of the graphical pointer on the display, and an outer shell surrounding and removably attached to the base pointing unit. A user has to purchase only one base computer mouse in order to accommodate other users. The shells are easily switched since the users do not have to unplug the base computer mouse to switch to a different computer mouse, and they are relatively inexpensive compared to purchasing completely separate computer mice. Different shells can be used with a common base computer mouse for different computer systems, and the outer shell might accordingly have a fewer number of buttons than there are switches on the base pointing unit.

An ergonomic computer mouse has support surfaces that are adjustable in two directions and that distribute the mechanical pressure points afforded by the mouse to the metacarpal region. The mouse has a housing with a proximal metacarpal support and a distal metacarpal support on its upper surface that are separated by a midsection. In use, the proximal end of the user's metacarpal hand region rests on the proximal metacarpal support, the distal end of the user's metacarpal hand region rests on the distal metacarpal support, and the remainder of the user's metacarpal hand region between their proximal and distal ends span the midsection. The mouse may further include a pivot mechanism that couples an upper and lower portion of the mouse housing together. The pivot mechanism may allow a user to adjust the upper and lower housing portions in pitch and roll directions with respect to one another.

An ambidextrous upright computer mouse includes a relatively upright finger engaging side on one side, and a thumb engaging side on an opposite side. Two sets of buttons are positioned at opposite ends of the finger engaging side. The mouse is symmetrical about a vertical transverse medial plane. When the finger engaging side is on the right side, the mouse can be grasped by a right hand. When the mouse is rotated so that the finger engaging side is on the left side, it can be grasped by the left hand. There is always a set of buttons at the forward end of the mouse, regardless of its orientation. Only one set of buttons is enabled at any time. The sets of buttons are alternately enabled and disabled by moving a selector switch. Ambidexterity is provided without compromising feel and comfort for either hand.

While these ergonomic mouse devices may be suitable for the purposes for which they were designed, they would not be as suitable for the purposes of the present invention, as hereinafter described.

SUMMARY OF THE PRESENT INVENTION

The present invention discloses a computer mouse having a body with an ovate palm support area and a planar peripherally receding support for the hypothenar mass and left and right anterior buttons eccentrically positioned askew the apex of the ovate form with one button located on a platform and elevated and angularly positioned relative to the other button that is substantially planar. The button platform could also be selectively movable along a limited distance of the anterior periphery of the body to allow a user to adjust the present invention to conform to different sized hands and fingers of varying lengths. The present invention is designated to elevate the wrist by supporting the palm so the hand is comfortably bent slightly downward and not in the unnatural upward angle with the writs resting on the surface area thereby applying pressure thereto and affecting the related nerves and arteries passing through the underside of the wrist that is common in the prior art.

A primary object of the present invention is to provide an ergonomic computer mouse that will prevent repetitive stress disorders such as carpal tunnel syndrome by providing a body portion with an ovoid palm support area and a planar peripherally receding support for the hypothenar muscle mass to relieve stress placed upon critical wrist pressure points and the associated arteries and nerves that affect the hand and related appendages.

An additional object of the present invention is to provide an ergonomic computer mouse having left and right anterior buttons eccentrically positioned askew the apex of the ovate form.

A further object of the present invention is to provide an ergonomic computer mouse wherein one button is positioned on a platform extending from the body portion and is elevated and angularly positioned relative to the other button that is substantially planar.

A yet further object of the present invention is to provide an ergonomic computer mouse wherein the button platform is adjustable and can be peripherally positioned within a limited range along the anterior body portion to accommodate the user's hand.

Another object of the present invention is to provide an ergonomic computer mouse that could be manufactured for left-handed usage.

One more object of the present invention is to provide an ergonomic computer mouse that is simple and easy to use.

A further object of the present invention is to provide an ergonomic computer mouse that is economical in cost to manufacture.

Further objects of the present invention will appear as the description proceeds.

To the accomplishments of the above and related objects, this invention may be embodied in the form illustrated in the accompanying drawings, attention being called to the fact; however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

Figure 1:
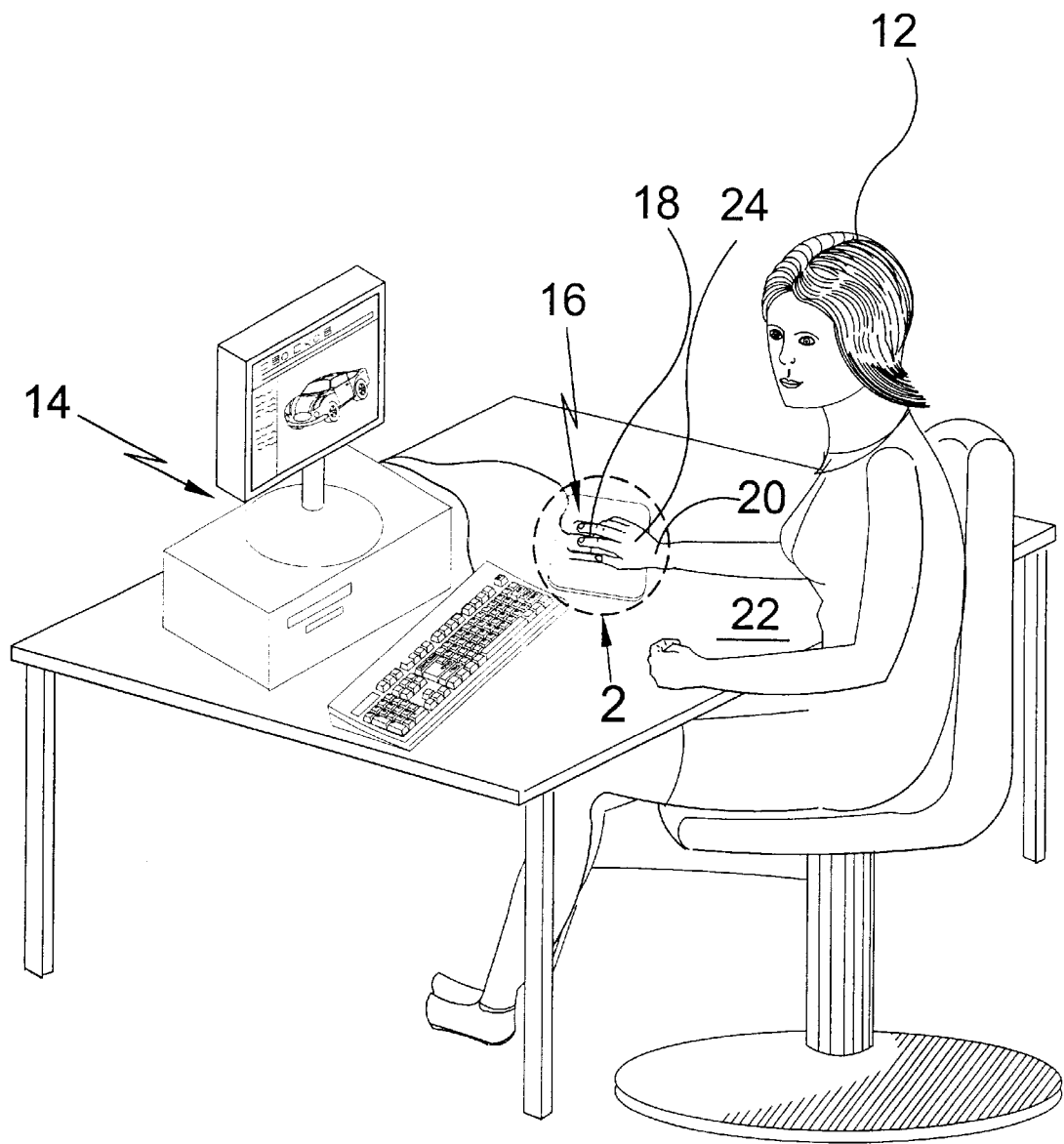
FIG. 1 is a perspective view of the prior art in use.

With regard to reference numerals used, the following numbering is used throughout the drawings.

10 present invention
12 user
14 conventional computer
16 conventional mouse
18 fingers
20 wrist
22 surface
24 hand
26 median nerve
28 ulnar nerve
30 radial artery
32 ulnar artery
34 thenar region
36 hypothenar region
38 ovate palm support
40 left button
42 hypothenar support
44 right button
46 right button platform
48 mouse ball
50 pinky finger
52 ring finger
54 index finger
56 middle finger
58 thumb
60 left button
62 left button platform
64 right button

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Turning to FIG. 1, shown therein is a perspective view of the prior art in use depicting a woman user 12 using a conventional computer 14 and mouse 6 and demonstrating the unnatural positioning of the users fingers 18 and wrist 20 when using such a mouse 16. The wrist 20 is resting on the surface 22 thereby applying pressure thereto as the hand 24 is bent upward subjecting the user 12 to prolonged wrist flexion, two actions which could conjuntively cause the compression of the medial nerve and result in a repetitive stress disorder. The risk of such disorders increase because many prior art mouse 16 designs require the buttons to be pressed by the fingertips demanding the flexion of all three finger joints and the repetitive use of the related flexor tendons.

Figure 2:
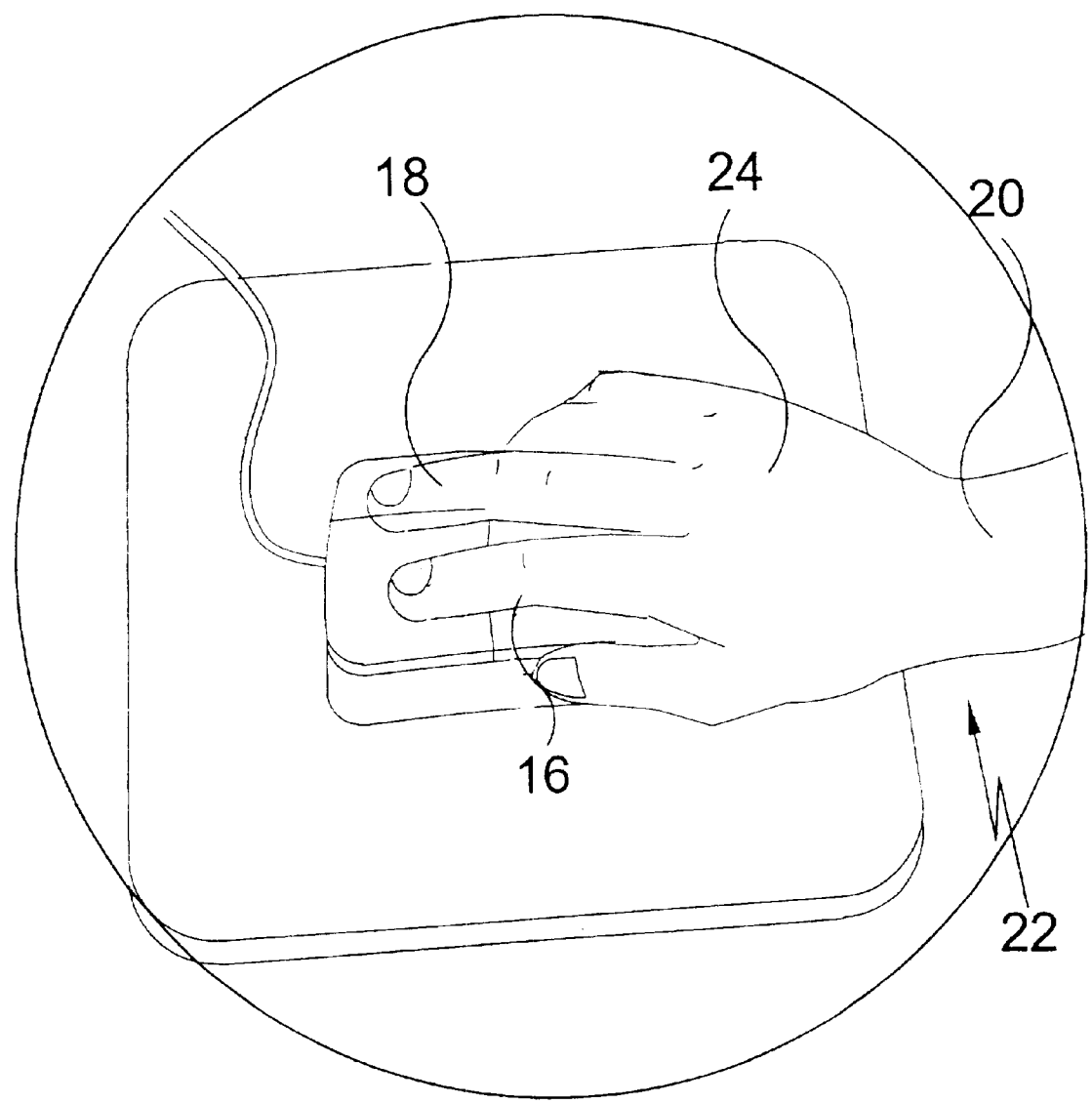
FIG. 2 is an enlarged perspective view of the prior art in use.

Turning to FIG. 2, shown therein is an enlarged view of a user using a conventional computer mouse 16 taken from FIG. 1 as indicated demonstrating the unnatural positioning of the user's fingers 18 and wrist 20 when using such a mouse. The wrist is resting on the surface 22 thereby applying pressure thereto as the hand 24 is bent upward so that the palmar arch and the first and second fingers are on top of the mouse, the thumb along one side and the third and fourth fingers on the other side. The ulnar and median nerves run through the underside of the wrist to the hand as do the ulnar and radial arteries which supply blood to the five digits. The pressure applied to the underside of the wrist combined with the bent wrist could affect the nerves and restrict the blood supply to the hand. The median nerve supplies cutaneous branches to the thumb and the first and second fingers with the two fingers susceptible to repetitive movement disorders from continuously pressing the mouse buttons. The median nerve is particularly vulnerable to pressure applied to the underside of the wrist and the lower palm because its recurrent branch (motor branch) lies superficially therein.

Figure 3:
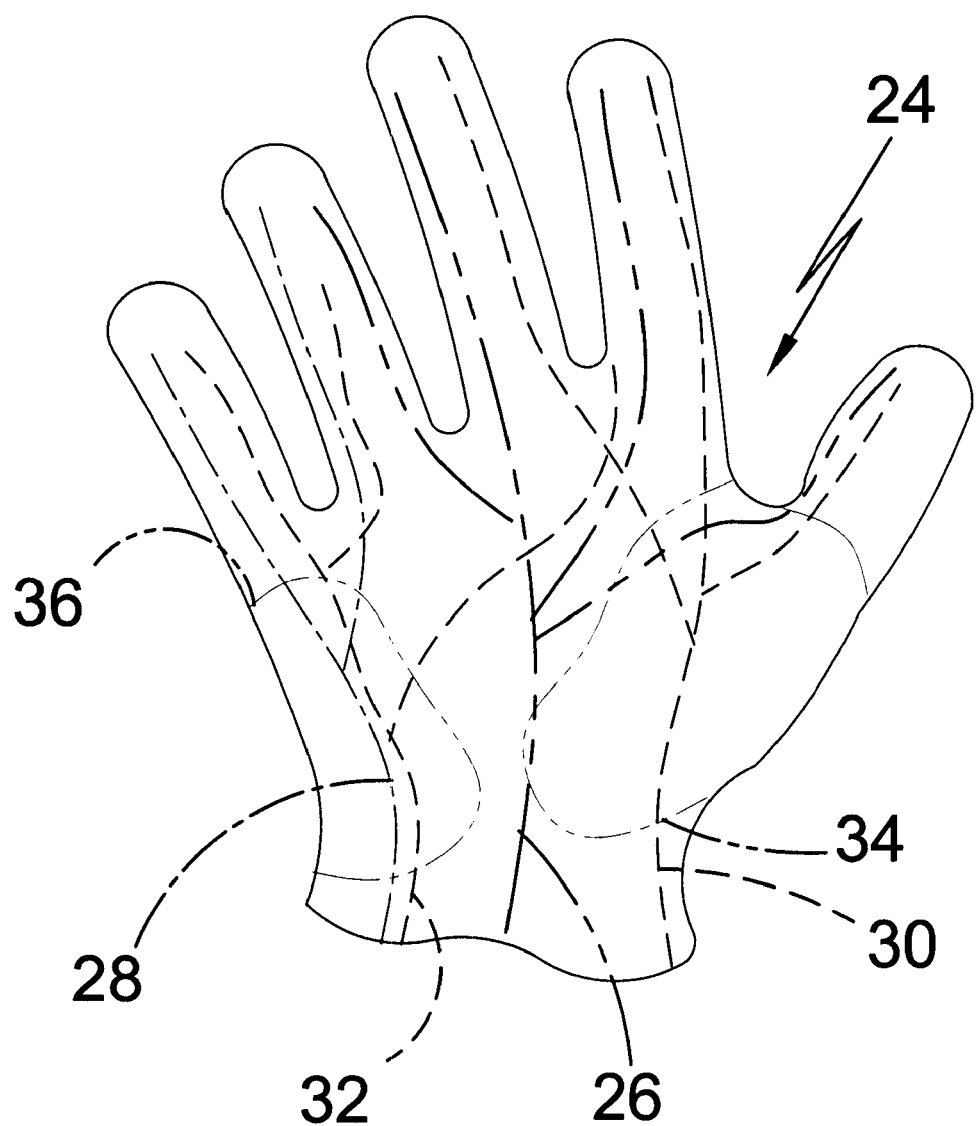
FIG. 3 is a palmar view of a human hand.

Turning to FIG. 3, shown therein is a palmar view of a human hand 24 approximating the location of the median nerve 26, the ulnar nerve 28, the radial artery 30, the ulnar artery 32 and the thenar 34 and hypothenar regions 36 of the palm.

Figure 4:
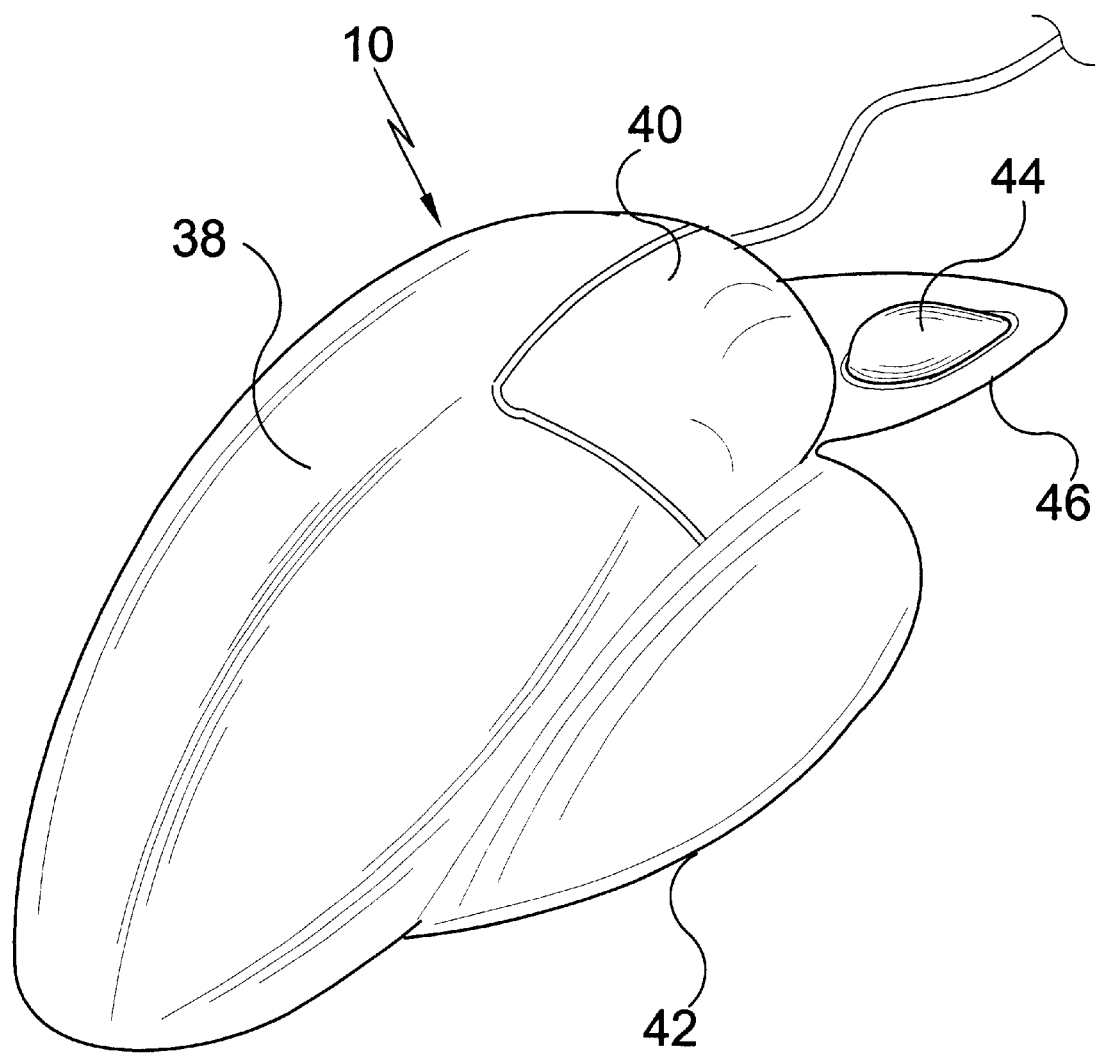
FIG. 4 is a perspective view of the present invention.

Turning to FIG. 4, shown therein is a perspective view of the present invention 10, an ergonomic mouse 10 having an ovate palm support 38 with an integral left click button 40 a hypothenar support platform 42 and a raised arcuate right button 44 on a substantially planar platform 46. The palm of the hand rests on the apex of the ovate palm support 38 so the wrist bends slightly downward with the curvature of the mouse 10 body thus relieving the stress placed upon the related flexor tendons. The weight of the hand is distributed throughout the meaty part of the palm against the ovate palm support 38 so as to relieve the pressure that the prior art places against the bent wrist area and its critical tendons, nerves and arteries.

Figure 5:
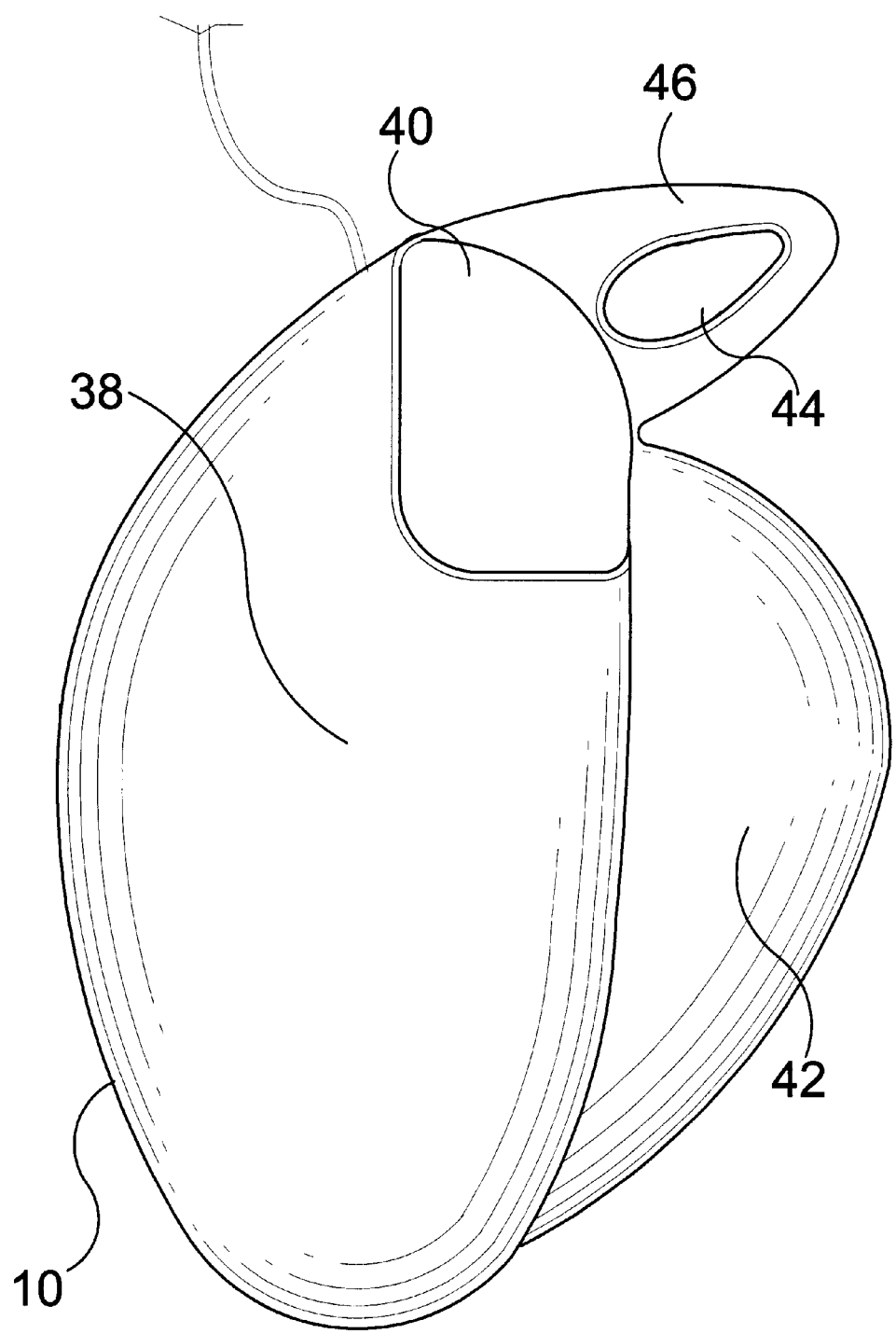
FIG. 5 is a top view of the present invention.

Turning to FIG. 5, shown therein is a top view of the present invention 10 showing elements previously disclosed.

Figure 6:
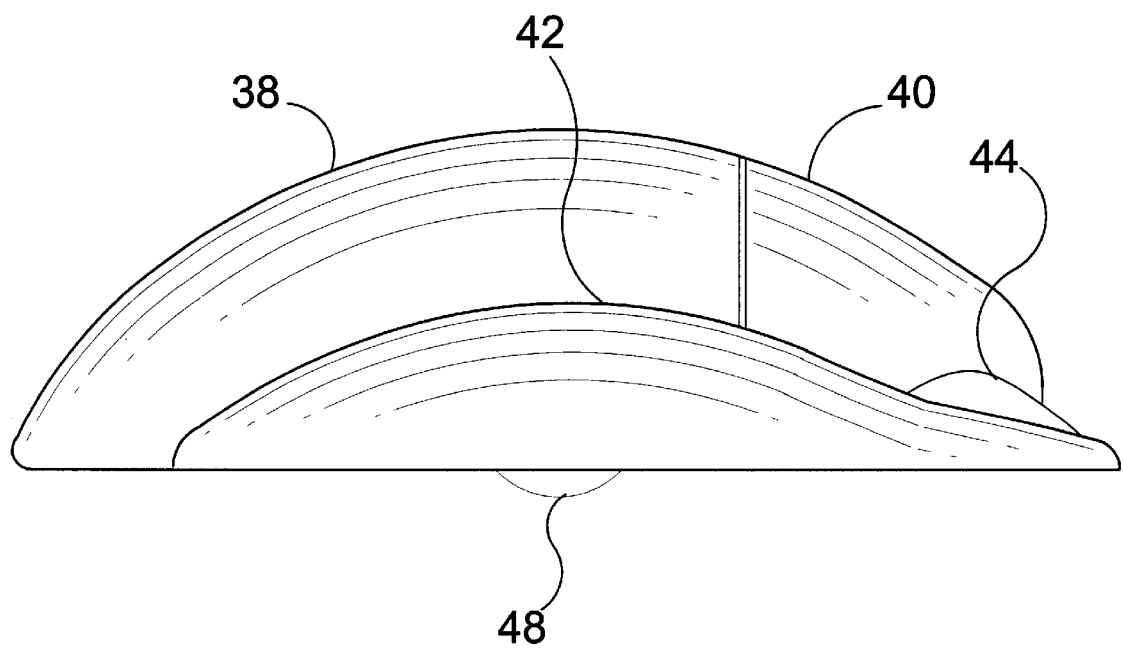
FIG. 6 is a side view of the present invention.

Turning to FIG. 6, shown therein is a side view of the present invention 10 showing elements previously disclosed along with the mouse ball 48 conventionally disposed on the flat underside of the mouse 10.

Figure 7:
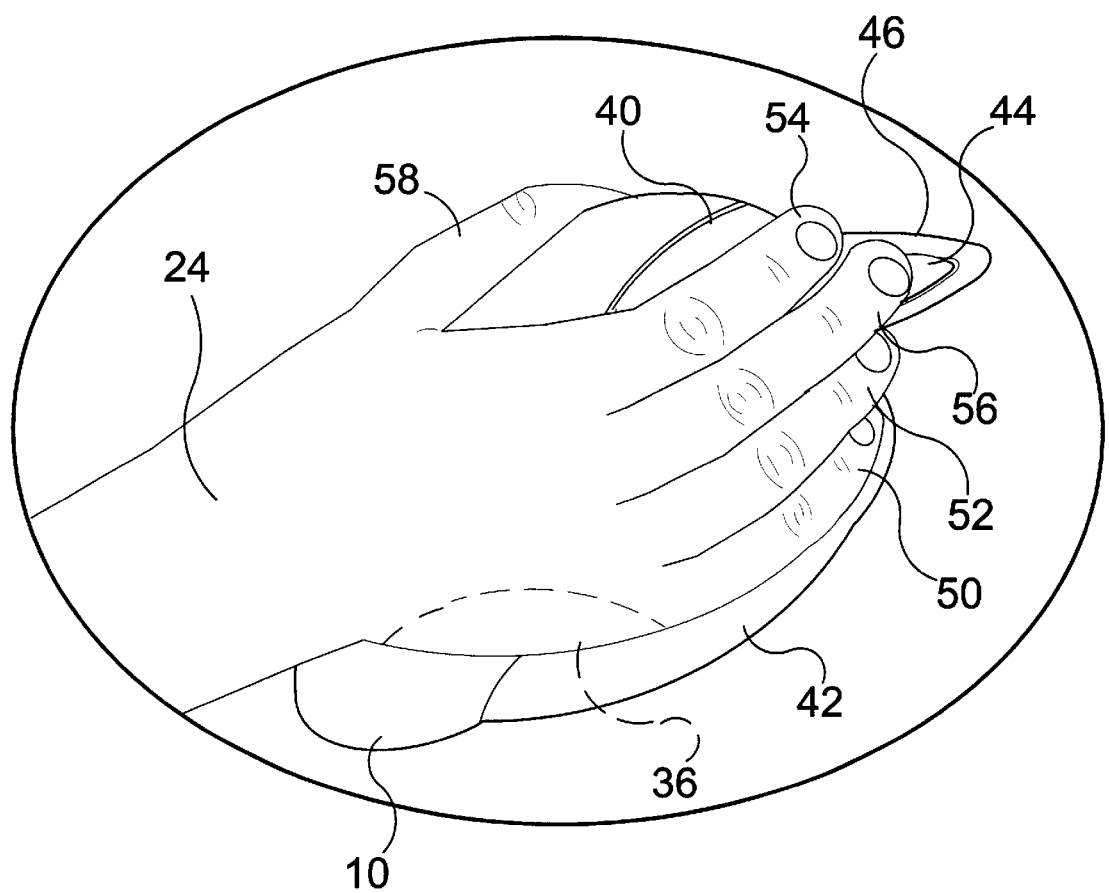
FIG. 7 is a perspective view of the present invention in use.

Turning to FIG. 7, shown therein is a perspective view of the present invention 10 with the user's hand 24 resting on the arcuate, ovate palm support on the body of the mouse 10. The hypothenar region of the hand and the pinky 50 and ring 52 fingers are resting on the hypothenar platform. The index 54 finger rests on the left button 40 in such a manner that pressure application from any joint of the appendage will activate the button 40. The right button 44 protrudes from the right button platform 46 so that a sweeping motion of the middle 56 finger from any direction will act upon the button 44. The thumb 58 is shown along with other elements previously disclosed.

Figure 8:
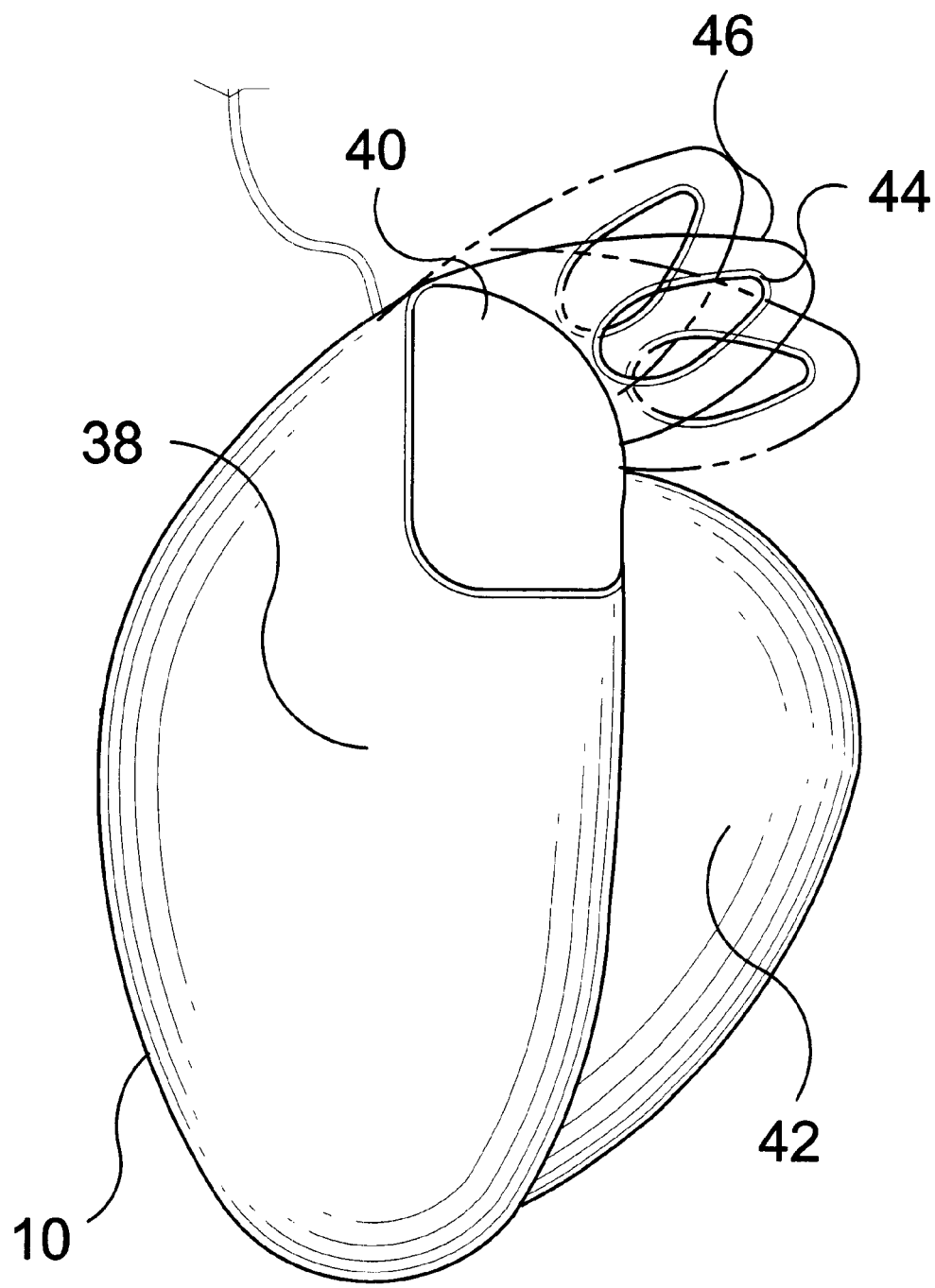
FIG. 8 is a top view of the present invention.

Turning to FIG. 8, shown therein is a top view of the present invention 10 having a rotatable, locking right button platform 46 that would allow a user to configure the placement of the right button 44 relative to the left button 40 and the hypothenar platform 42 to conform to the shape and finger length of different users' hands. The ovate palm support 38 is also shown.

Figure 9:
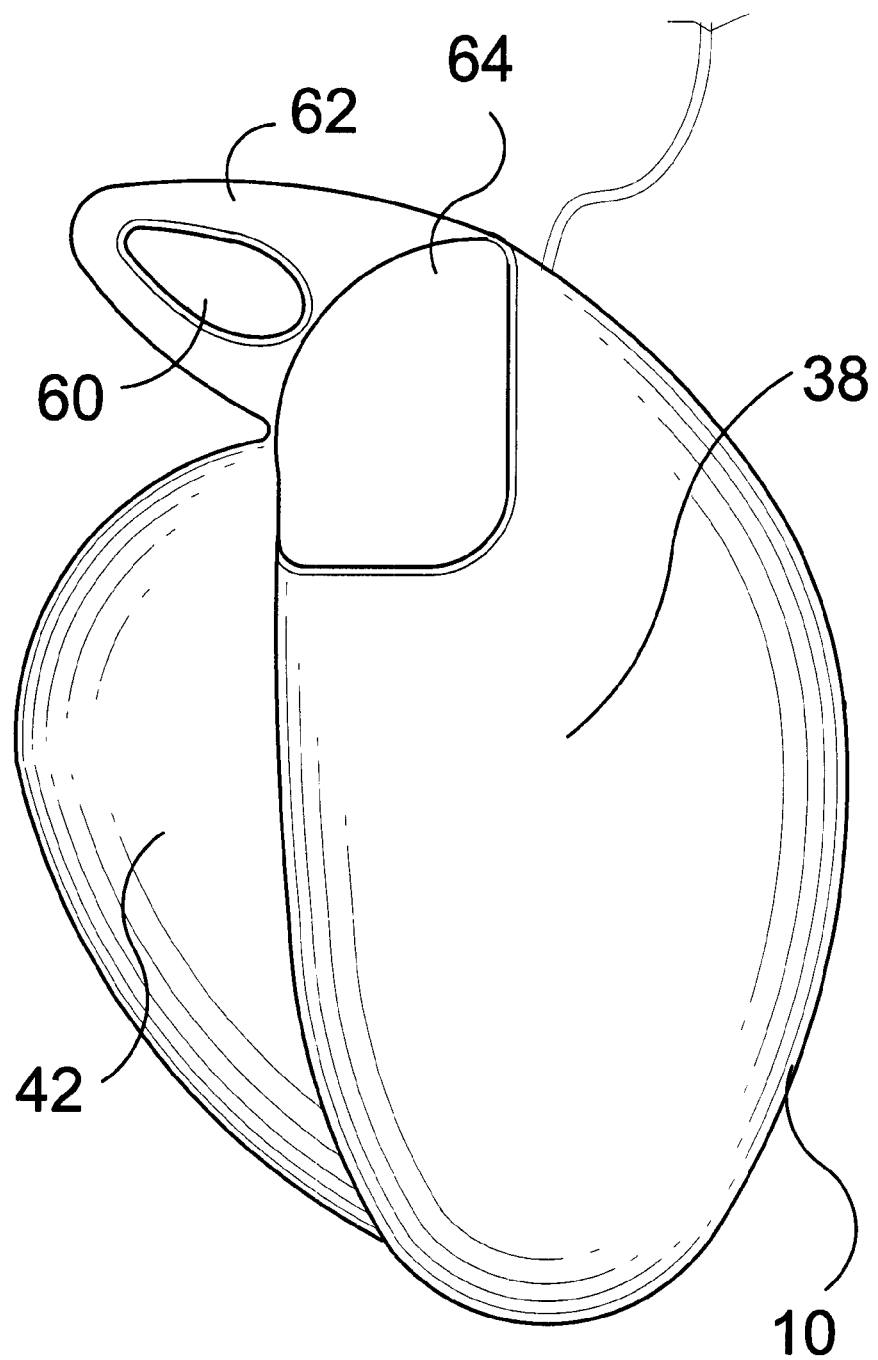
FIG. 9 is a top view of the present invention configured for left-handed use.

Turning to FIG. 9, shown therein is a top view of the present invention 10 adapted for use by left-handed people wherein the left button 60 resides on the platform 62 adjacent the hypothenar platform. The right button 64 is shown along with other elements previously disclosed. The right button 64 is shown along with other elements previously disclosed.

Figure 10:
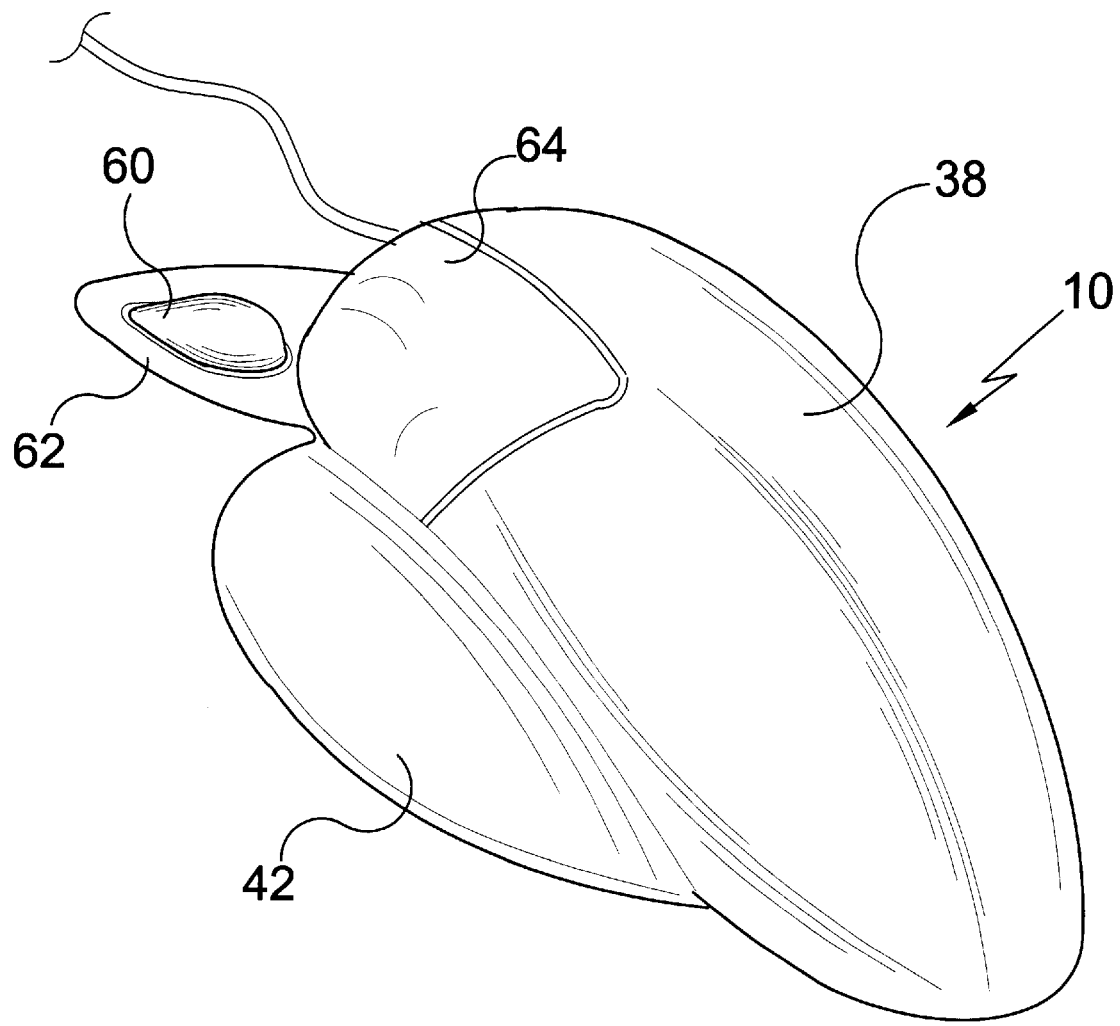
FIG. 10 is a perspective view of the present invention configured for left-handed use.

Turning to FIG. 10, shown therein is a perspective view of a left-handed version of the present invention 10. Other elements previously disclosed are also shown.

Figure 11:
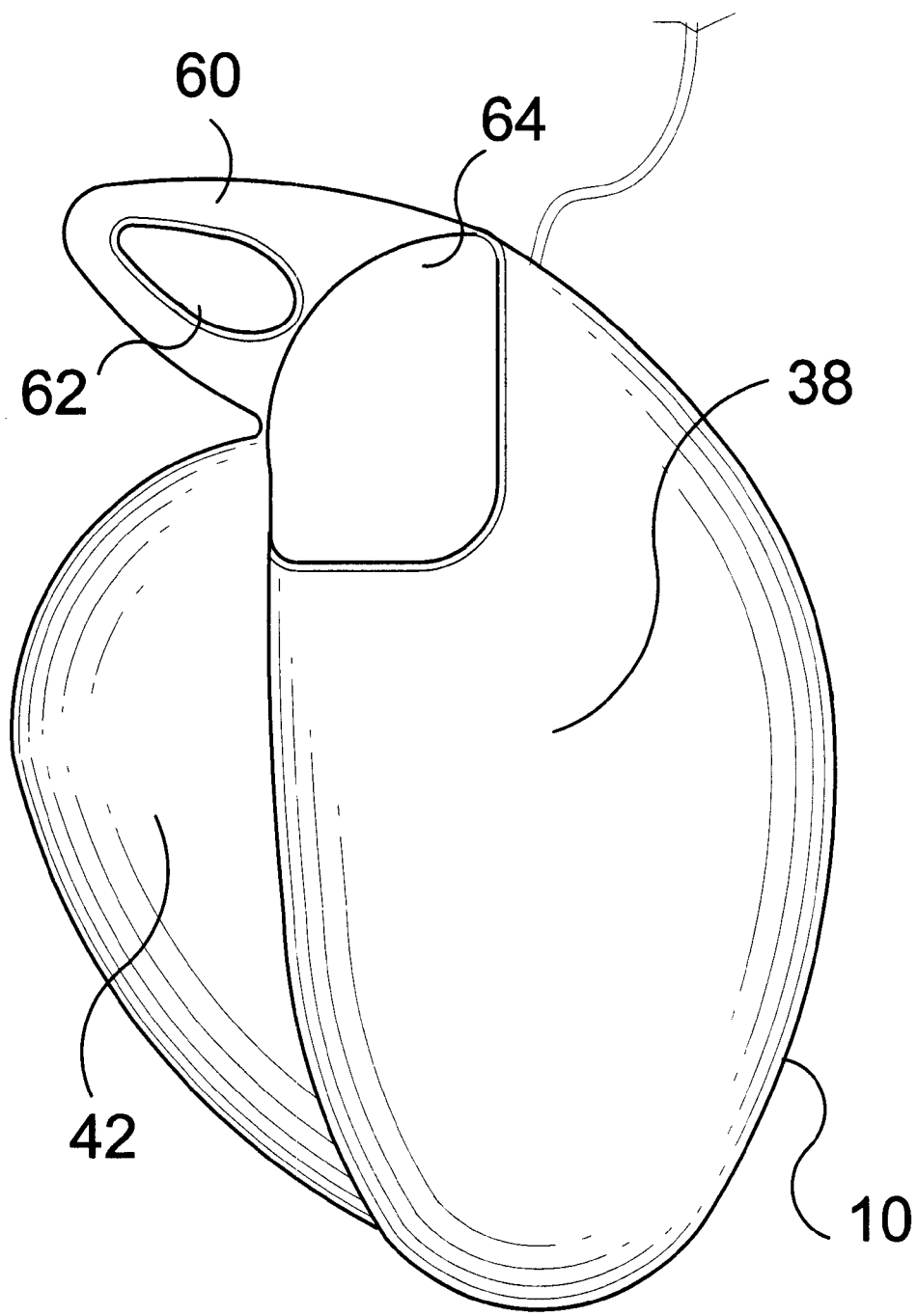
FIG. 11 is a top view of the present invention configured for left-handed use.

Turning to FIG. 11, shown therein is a top view of a left-handed version of the present invention 10. Other elements previously disclosed are also shown.

Figure 12:
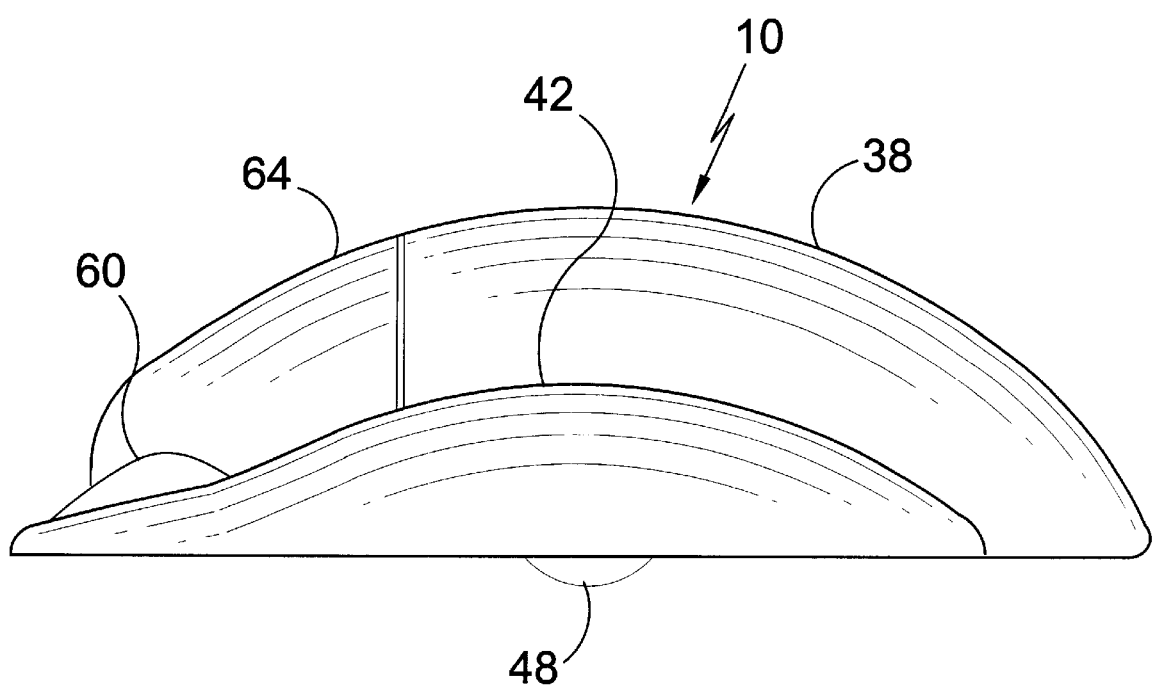
FIG. 12 is a side view of the present invention configured for left-handed use.

Turning to FIG. 12, shown therein is side view of a left-handed version of the present invention 10. Other elements previously disclosed are also shown.

Figure 13:
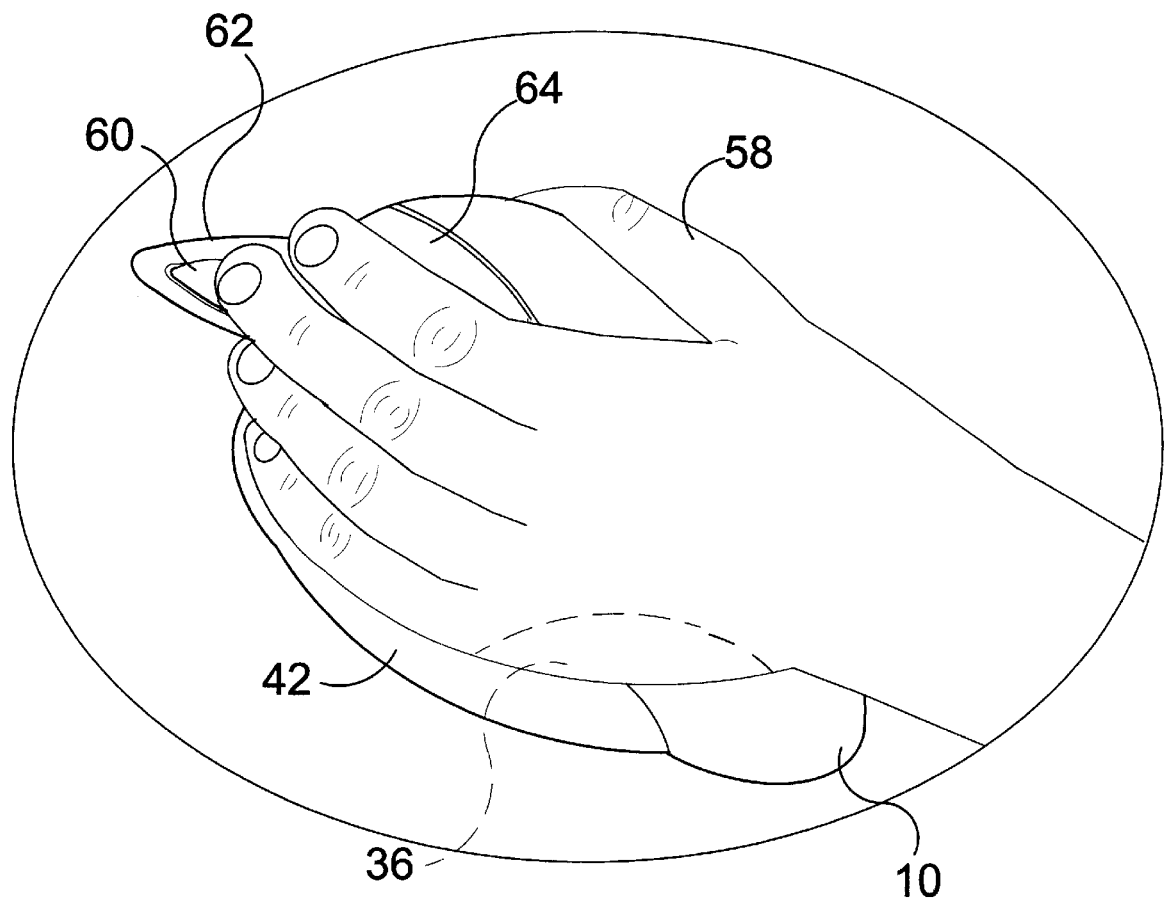
FIG. 13 is a perspective view of the present invention configured for left-handed use.

Turning to FIG. 13, shown therein is a perspective view of the present invention 10 in use with the user's palm resting on the arcuate, ovate palm support on the body of the mouse 10. The hypothenar region 36 of the hand and the pinky and ring fingers are resting on the hypothenar platform 42. The index finger rests on the right button 64 in such a manner that pressure application from any joint of the appendage will activate the button. The left button 60 protrudes from the left button platform 62 so that a sweeping motion of the middle finger from any direction will act upon the button. Thumb 58 is also shown.

Figure 14:
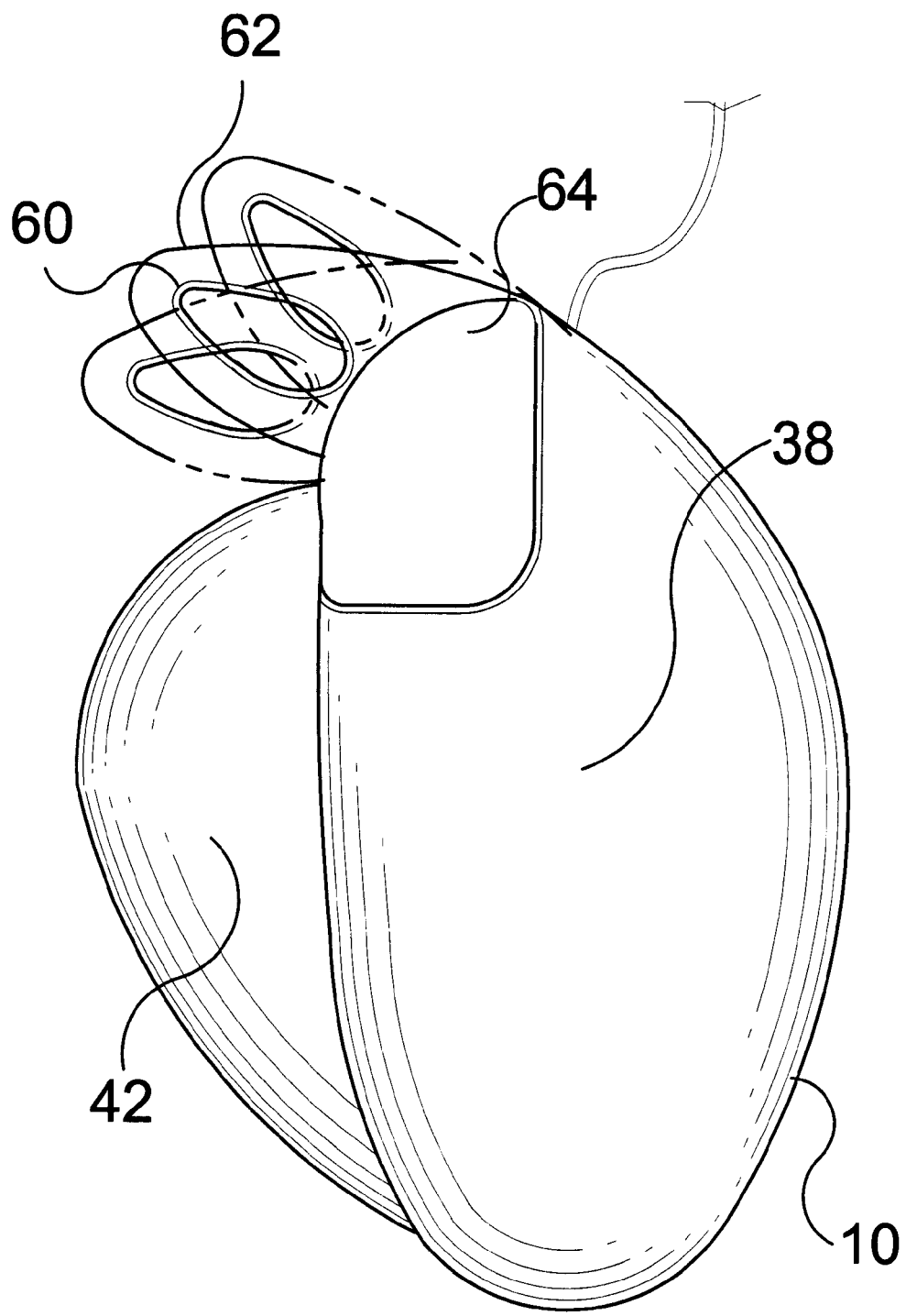
FIG. 14 is a top view of the present invention configured for left-handed use.

Tuning to FIG. 14, shown therein is a top view of a left-handed version of the present invention 10 with a rotatable, locking left button platform 62 that allows a user to configure the placement of the left button 60 relative to the right button 64 and the hypothenar platform 42 to conform to the shape and finger length of different users' hands. The ovate palm support 38 is also shown.

I claim:

1. An input device for a conventional computer for use with a hand of a user, comprising:

a. a mouse, said mouse having an ovate shape, said mouse having a front end, a rear end, a pair of sides, a top side and a bottom side;

b. an ovate palm support disposed on said mouse whereby a palm of a hand of the user is comfortably supported;

c. a hypothenar platform disposed on a side of said mouse for supporting the hypothenar region of the hand of the user;

d. a first button disposed on said mouse whereby an index finger of the hand of the user is comfortably supported;

e. said hypothenar platform bulging out from a side of said mouse at a level substantially below a level of said palm support;

f. a planar platform extending out from said mouse on the same side as said hypothenar platform toward a front end of said mouse and having a second button mounted; and g. said planar platform being rotatable and lockable so that said planar platform can be positioned to conform to the shape and finger length of different users' hands.

2. The apparatus of claim 1, wherein said ovate palm support further comprises an ovate palm support disposed substantially in the center of said top side of said mouse.

3. The apparatus of claim 2, wherein said hypothenar platform recedes peripherally from a side of said mouse.

4. The apparatus of claim 3, wherein said first button is disposed on a top, side of said first end of said mouse.

5. An input device formed as a mouse for use with a conventional computer, comprising:

a. a ovate body for supporting a palm of a hand of a user, said ovate body having a predetermined height;

b. a hypothenar platform shaped as a semi-circle extending outward from a side of said ovate body at a height substantially half of said predetermined height, said hypothenar platform comfortably supports the hypothenar region of said user's hand;

c. a first button formed integral with said ovate body, said first button is positioned at a front end of said ovate body and adjacent to a connection point of said ovate body with said hypothenar platform, said first button is selectively operable with an index finger of said user's hand; and d. a planar platform extending from said front end of said ovate body, said planar platform includes a second button selectively operable with a middle finger of said user, said planar platform is selectively rotateable and moveable about a vertical axis and a horizontal axis of said ovate body and is selectively lockable in a desired position; wherein said user grips said mouse in a hand-shake position whereby said palm of said user rests on said ovate body and said hypothenar region rests on said hypothenar platform, said index finger resting on said first button and said planar platform is selectively moved, rotated and locked for comfortable placement of said middle finger thereon thereby allowing for natural and comfortable operation of said input device.

* * * * *